(12) United States Patent
Nakamatsu et al.

(10) Patent No.: US 10,155,340 B2
(45) Date of Patent: Dec. 18, 2018

(54) MOLD, METHOD FOR PRODUCING MOLD, AND METHOD FOR PRODUCING NANOIMPRINT FILM

(75) Inventors: Kenichiro Nakamatsu, Osaka (JP); Hidekazu Hayashi, Osaka (JP); Kiyoshi Minoura, Osaka (JP); Akinobu Isurugi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 1250 days.

(21) Appl. No.: 14/004,190

(22) PCT Filed: Mar. 1, 2012

(86) PCT No.: PCT/JP2012/055248
§ 371 (c)(1),
(2), (4) Date: Sep. 10, 2013

(87) PCT Pub. No.: WO2012/124498
PCT Pub. Date: Sep. 20, 2012

(65) Prior Publication Data
US 2013/0341823 A1    Dec. 26, 2013

(30) Foreign Application Priority Data
Mar. 11, 2011    (JP) .................................. 2011-054537

(51) Int. Cl.
*B29C 33/38*    (2006.01)
*B82Y 40/00*    (2011.01)
(Continued)

(52) U.S. Cl.
CPC ........ *B29C 59/026* (2013.01); *B29C 33/3842* (2013.01); *B29C 33/424* (2013.01);
(Continued)

(58) Field of Classification Search
None
See application file for complete search history.

(56) References Cited

U.S. PATENT DOCUMENTS 5,408,070 A * 4/1995 Hyllberg ............ G03G 15/0233
219/216
2006/0198991 A1* 9/2006 Takiyama ............... B29C 39/18
428/172
(Continued)

FOREIGN PATENT DOCUMENTS

JP    6144607    3/1986
JP    08281796 A * 10/1996
(Continued)

OTHER PUBLICATIONS

International Search Report PCT/ISA/210 for International Application No. PCT/JP2012/055248 Dated Mar. 1, 2012.
(Continued)

*Primary Examiner* — Jeffrey M Wollschlager
*Assistant Examiner* — Armand Melendez
(74) *Attorney, Agent, or Firm* — Harness, Dickey & Pierce, P.L.C.

(57) ABSTRACT

A mold is disclosed, which is capable of producing a nanoimprint film without a problem of clogging of irregularities of the mold with a resin material. A method for producing the mold and a method for producing a nanoimprint film using the mold are further disclosed. In an embodiment, the mold includes: a first surface having a nanostructure including plural recesses spaced at an interval of less than 1 μm between bottom points of adjacent recesses; and at least two second surfaces substantially not having the nanostructure, wherein the first surface is coplanar with the at least two second surfaces and is positioned between two second surfaces.

16 Claims, 13 Drawing Sheets

(51) Int. Cl.
  *B29C 59/02* (2006.01)
  *B29C 33/42* (2006.01)
  *B29C 59/04* (2006.01)
  *B82Y 30/00* (2011.01)
(52) U.S. Cl.
  CPC ........ *B29C 59/04* (2013.01); *B29C 2059/023* (2013.01); *B82Y 30/00* (2013.01); *B82Y 40/00* (2013.01)

(56) References Cited

U.S. PATENT DOCUMENTS

2007/0001333 A1* 1/2007 Dias .................... B29C 35/0805
  264/40.6
2010/0284087 A1* 11/2010 Yamada .............. B29C 33/3842
  359/580
2011/0278772 A1* 11/2011 Inamiya ................ B29C 59/022
  264/496
2012/0043297 A1 2/2012 Fujii et al.

FOREIGN PATENT DOCUMENTS

| | | | |
|---|---|---|---|
| JP | 2007270213 A | 10/2007 | |
| JP | 2009065211 A | 3/2009 | |
| JP | 2010161186 A | 7/2010 | |
| JP | WO 2010079820 A2 * | 7/2010 | ........... B29C 59/022 |
| JP | 2010253819 A | 11/2010 | |
| JP | 2011026648 A | 2/2011 | |
| WO | WO-2009-110139 A1 | 9/2009 | |
| WO | WO-2010125795 A1 | 11/2010 | |

OTHER PUBLICATIONS

International Search Report PCT/ISA/210 for International Application No. PCT/EP2012/055248 Dated Mar. 1, 2012.

* cited by examiner 1b   1a   1b

MOLD, METHOD FOR PRODUCING MOLD, AND METHOD FOR PRODUCING NANOIMPRINT FILM

TECHNICAL FIELD

The present invention relates to a mold, a method for producing a mold, and a method for producing a nanoimprint film. More specifically, the present invention relates to a mold suitably used in production of a nanoimprint film including a nanometer-sized irregularities, a method for producing the mold, and a method for producing the nanoimprint film.

BACKGROUND ART

Recently, attention is drawn to the technique of imprinting a pattern by pressing a mold with nanometer-sized (0.001 to 1 μm) irregularities (hereinafter, also referred to as a nanostructure) to a resin material applied on a substrate, namely, the nanoimprint technique. Studies have been made for application of that technique to optical materials, miniaturization of ICs, substrates for clinical examinations, and the like.

In nanometer-size microprocessing by a conventional photolithography technique, a shorter exposure wavelength is employed to solve insufficient resolution that is caused by diffraction occurring during exposure through a mask, which causes problems of complication of the device and cost increase. The nanoimprint technique allows easy formation of a nanometer-sized pattern by embossing, thereby solving these problems. Moreover, the nanoimprint technique may enable mass production of optical materials required to have a nanometer-sized microstructure, at low cost. With respect to a common embossing in which a pattern is not in a nanometer size, a product with a surface on which frosting is continuously formed and a frosting roll for producing the above product are known (see Patent Literature 1, for example).

Known methods used in the nanoimprint technique include a thermal nanoimprint technique and ultraviolet (UV) nanoimprint technique. In the UV nanoimprint technique, for example, an ultraviolet curable resin is applied to a substrate to form a thin film, and a mold having a nanostructure is pressed to the thin film. Then, the thin film is irradiated with ultraviolet rays to give a thin film (hereinafter, also referred to as a nanoimprint film) with a nanostructure in the inverse shape of that of the mold. When such methods are used at the research stage, a nanoimprint sheet is commonly produced by batch treatment using a plate-shaped mold.

For mass production of nanoimprint sheets by the nanoimprint technique at low cost, roll-to-roll treatment is more suitable than batch treatment. The reason for this is that, in the roll-to-roll treatment, a nanostructure can be formed on the outer peripheral surface of the mold roll so that nanoimprint sheets can be produced continuously for a longtime.

An exemplary optical material having a nanostructure is mentioned here. A known nanostructured body in optical materials is a "moth-eye structure". The moth-eye structure includes a large number of protrusions spaced at an interval being sufficiently small relative to the visible light, between top points thereof. Examples of optical elements having a moth-eye structure include a transparent substrate with a surface on which a moth-eye structure is formed. With such a moth-eye structure, since the size ratio of the protrusion to the wavelength of the visible light is sufficiently small, protrusions formed allows visible light incident upon the surface of a transparent substrate to recognize that the refractive index successively changes from the air layer to the transparent substrate, and not to recognize the surface of the transparent substrate as an interface interrupting the refractive index. As a result, reflected light generated on the surface of the transparent substrate is significantly reduced.

In the field of technology for producing optical materials having such nanostructured bodies, a known method uses a mold that is an aluminum substrate with nanometer-sized holes formed on the surface by anodization. This method allows formation of nanostructured bodies that are distributed microscopically irregularly (at random) and are distributed macroscopically regularly. That is, employment of this method in production of an imprint roller allows formation of seamless nanostructured bodies, which is needed for continuous production, on the surface of a pillar- or cylinder-shaped mold roller. Anodization does not relate to the nanoimprint technique, and a known technique thereof include anodizing an aluminum layer optionally with masking on a portion thereof and then removing the anodized part of the aluminum layer (see Patent Literature 2, for example).

CITATION LIST

Patent Literature

Patent Literature 1: JP-A S61-44607
Patent Literature 2: JP-A 2007-270213

SUMMARY OF INVENTION

Technical Problem

The present inventors focused on the pencil hardness and abrasion resistance of the surface of nanoimprint films represented by moth-eye films. FIG. 20 is a schematic diagram illustrating nanoimprint films classified by relations between the resin hardness thereof and the pencil hardness and abrasion resistance. A nanoimprint film 111 is commonly formed on a base film 112. The nanoimprint film 111 has a structure in which nanometer-sized protrusions are arrayed, and therefore, a stress by mechanical irritation, such as tracing with a pencil or rubbing with steel wool, tends to be concentrated at each protrusion. In such a state, if an imprint resin itself is hardened, resistance against a pressure in a direction of pushing a pencil 113, namely, the pencil hardness is improved. However, when rubbed with steel wool, tops of protrusions are likely to be brittle to be chipped, which means insufficient steel wool resistance. If an imprint resin is softened to allow protrusions to follow rubbing and return to the original shape flexibly, the surface is smoother to improve the steel wool resistance. However, protrusions may be deformed by a pressure in a direction of pushing the pencil 113, and fail to return to its original shape and set in the deformed shape.

An exemplary method for solving such problems is providing a hard coat layer between a base film and a nanoimprint film. A hard coat layer is provided as a bottom layer and an imprint resin layer is provided as a top layer on a base film, and the balance of the hardness of these layers is adjusted. Then, the hardness is expressed by the hard coat layer and the flexibility is expressed by the imprint resin layer. Thus, the resulting product can be excellent in both the pencil hardness and abrasion resistance.

Providing a hard coat layer is also effective for achieving adhesiveness between a base film such as a TAC (Tri Acetyl Cellulose) film and a nanoimprint film. For example, in the case where a nanoimprint film is directly formed on a TAC film by a roll-to-roll method, it is difficult to secure adhesion between the nanoimprint film and the TAC film. When the contact area between the base film as a ground and the imprint resin layer is large, adhesiveness is provided to some extent. In contrast, when the contact area is small, adhesiveness tends to be lowered.

To solve the above problem, the following method can be considered. When a hard coat resin is applied to a base film, a solvent is used to melt the base film so that a region where a molten component of the base film and the solvent are mixed with each other is formed. Thus, the contact area between the base film and the hard coat layer is increased. Moreover, an imprint resin is applied to the hard coat layer before the hard coat layer is completely cured, thereby providing a region where the hard coat resin and the imprint resin are partly mixed with each other. Thus, the contact area between the hard coat layer and the imprint resin layer is increased to enhance the adhesion.

Studies by the present inventors, however, revealed that use of a hard coat layer causes another problem. FIG. 21 is a schematic diagram illustrating a state where a mold with nanometer-sized irregularities on its surface is rolled on the surface of a film including a laminate of a base film, a hard coat layer, and an imprint resin layer, to provide the imprint resin with a nanostructure.

In FIG. 21, a long arrow on the right side indicates a sliding direction of the film. The region above the mold is a region where imprinting is not yet performed, and the region below the mold is a region where imprinting is already performed. A mold 124 has a cylindrical shape and is rotatable. As illustrated in FIG. 21, in the case of an imprinting treatment on a film including a laminate of a base film 122, a hard coat layer 123, and an imprint resin layer 121, a coating margin is needed for each lamination for process reasons. In other words, the hard coat layer 123 needs to have a narrower width than the base film 122, and the imprint resin layer 121 needs to have a narrower width than the hard coat layer 123.

In production of a nanoimprint film by such a method, however, the hard coat layer 123 is partly present on the outermost surface, and therefore the hard coat resin is likely to clog the mold 124. Since the hard coat resin is a hard resin that has poor mold releasability, there may be a case where clogging with the hard coat resin stops the mold 124 or impairs the stress balance with another member to cause rupture of the film.

In actual production, an imprinting device is continuously driven for a long time using a long film. Expansion/contraction of the film during the imprinting, film waving due to external factors, and the like causes contact between the portion of the mold with irregularities clogged with the imprint resin and the region of the film subjected to imprinting, leading to a failure in appropriate formation of irregularities on the nanoimprint film.

Moreover, if the hard coat layer wraps around the roll-shaped mold, the surface thereof during the imprinting is rubbed to produce dust (white particles) suspended in air. The dust then adheres to the surface of the mold to cause defective recesses on the surface of the imprint resin. FIGS. 22 to 25 are schematic diagrams illustrating processes in which a defective recess is formed when a roll-shaped mold is used.

As illustrated in FIG. 22, a mold 134 contacts a hard coat layer to produce dust 135 suspended in air. The dust 135 suspended in air adheres to the surface of the mold, as illustrated in FIG. 23. Then, the film subjected to imprinting has a trace (defective recess) 136 of the dust formed on the film surface at a part corresponding to the dust 135 adhering to the mold, as illustrated in FIG. 24. As illustrated in FIG. 25, the defective recess 136 is enlarged after additional rolling of the mold.

FIGS. 26 to 28 are pictures each showing a portion where a defective recess is formed, and the same part after rolling is shown in each of the pictures. FIG. 26 shows the defective recess 136 after the first rolling, and the size of the defective recess is 102×100 µm. The defective recess 136 has a depth of about 5 µm. FIG. 27 shows the defective recess after the second rolling, and the size of the defective recess 136 is almost the same as that after the first rolling. FIG. 28 shows the defective recess after the $45^{th}$ rolling, and the size of the defective recess is 190×114 µm. It has been presumed that no more defective recesses are formed in the second or subsequent rolling because of adhesion of the dust, the cause of a defective recess, to the film subjected to imprinting. In actually, however, the defective recess grows in each rolling in which the defective recess formed in the first rolling serves as a core. The reason for this is presumably that the dust of the hard coat resin grows during repetitive imprinting due to adhesion of the imprint resin to the dust. Consequently, it is found that, even without designing problems such as expansion/contraction of the film or film waving, above problems may arise as long as the hard coat layer repeatedly contacts the mold.

Intensive studies by the present inventors also revealed the following problem. That is, even if no hard coat layer is provided and a base film and an imprint resin layer are directly attached to each other, curing inhibition (oxygen inhibition) occurs due to exposure of an end portion of the imprint resin layer to the air in a region corresponding to the border between the base film and the imprint resin. Therefore, an uncured imprint resin is likely to clog the mold.

The present invention has been devised in consideration of the state of the art, and aims to provide a mold capable of producing a nanoimprint film without clogging of irregularities of the mold with a resin material, a method for producing the mold, and a method for producing a nanoimprint film using the mold.

Solution to Problem

The present inventors made various investigations to solve the above problems, and focused on a method for producing a mold in which the nanostructure is not formed in a region contacting the hard coat layer. If this method is realized, irregularities of the mold are not clogged with the hard coat resin so that dust of the hard coat resin is not produced, thereby preventing a problem of defective imprinting.

Intensive studies by the present inventors clarified the following fact. That is, when the outer peripheral surface of the mold is masked at both ends which are directly contacting the hard coat layer or at portions slightly inside apart from the both ends and then the nanostructure is formed, it is possible to form a flat surface substantially not including nanometer-sized irregularities in a masked region. Moreover, the present inventors also found out that a region not subjected to masking is sufficiently large as a region where the nanostructure is to be formed, thereby solving the above problems to complete the present invention.

That is, the present invention is a mold including: a first surface having a nanostructure including plural recesses spaced at an interval of less than 1 μm between bottom points of adjacent recesses; and at least two second surfaces substantially not having the nanostructure, wherein the first surface is coplanar with the at least two second surfaces and is positioned between two second surfaces.

The present invention also is a method for producing a mold including a first surface having a nanostructure including plural recesses spaced at an interval of less than 1 μm between bottom points of adjacent recesses and a second surface substantially not having the nanostructure, the method including the step of masking a space where the second surface is to be formed.

The present invention further is a method for producing a nanoimprint film including plural protrusions spaced at an interval of less than 1 μm between top points of adjacent protrusions, the method comprising the steps of: applying a resin composition on a base film; and imprinting a pattern by pressing a mold to the applied resin composition and curing the resin composition, the mold being the mold of the present invention or a mold produced by the method for producing a mold of the present invention.

Features of the mold of the present invention and preferable embodiments thereof are first described in detail.

The mold of the present invention includes a first surface having a nanostructure including plural recesses spaced at an interval of less than 1 μm between bottom points of adjacent recesses, and at least two second surfaces substantially not having the nanostructure. The first surface is used as an imprinting region to produce a structure including nanometer-sized irregularities. The at least two second surfaces is formed at a position where irregularities of the mold are likely to be clogged. In this manner, the production process becomes more efficient and more reliable.

The first surface is coplanar with the at least two second surfaces, and is positioned between two second surfaces. With the first surface positioned between the second surfaces, a large area is easily kept for formation of a nanostructure which is mainly aimed. As used herein, "coplanar" refers to a state where planes can be regarded as substantially the same plane in a common mold, preferably in a mold for producing a nanoimprint film, namely, a state where the first surface and the at least two second surfaces shown in a cross section of a mold can be regarded to be substantially collinear with each other.

The configuration of the mold of the present invention is not especially limited as long as it essentially includes such components. The mold may or may not include other components. The mold is not necessarily made of a metallic material as long as it can imprint a pattern of irregularities to a resin composition. The mold may have a plate shape or cylindrical shape. The cylindrical shape is excellent from the standpoint of productivity of nanoimprint films because the roll-to-roll method can be employed in which a mold is rotated to continuously imprint a pattern of irregularities to a film drawn from a roll.

The mold preferably includes a base member covered with a member constituting the first surface and members constituting the at least two second surfaces. Formation of irregularities of a nanostructure requires high-precision technologies, and high-precision technologies are also required in a method for forming irregularities of the nanostructure in a region where irregularities are to be formed as distinguished from a region where no irregularities are to be formed. Therefore, if the mold may be prepared using different materials for its base member and for the surface, an efficient and high-performance mold is likely to be obtained.

An insulating film is preferably provided between the base member and the member constituting the first surface and between the base member and the members constituting the at least two second surfaces. In consideration of rigidity and processability of the mold, the base member is preferably made of a conductive substance such as metals, and the members constituting the first surface and the at least two second surfaces are also preferably made of conductive materials such as metals for the same reason. In the case that these members are made of different materials, however, corrosion (galvanic corrosion), for example, may occur at the interface between different metals during processing for obtaining the nanostructure such as anodization or etching. Therefore, from the standpoint of obtaining a higher-performance mold, an insulating film for protection is preferably formed between the member constituting the base and the member constituting the surface.

A material of the member constituting the first surface is preferably aluminum oxide, and materials of the members constituting the at least two second surfaces are preferably aluminum. An effective method for forming a precise nanostructure is repetitive treatment of anodization and etching of aluminum as described later. An exemplary embodiment of the mold produced by such a method is the present embodiment, and such a mold is excellent for use in formation of a nanoimprint film.

A material of the base member is preferably nickel or stainless steel. Nickel and stainless steel are easily processed and significantly contribute to cost reduction, and therefore are preferable as materials of the base member.

The first surface preferably has a microstructure including plural recesses spaced at an interval of 20 μm or more between bottom points of adjacent recesses. More preferably, the interval between bottom points of adjacent recesses is 60 μm or less. Depending on the application of the nanostructured body to be formed, not only the nanostructure, but also micron-sized irregularities may be required to be formed on the surface in anti-glare (AG) treatment. Specifically, in formation of a nanoimprint film to be used for the surface of a display panel, formation of a microstructure in addition to the nanostructure can have an effect of scattering light reflected on the surface of the display panel to blur the reflection of the image. In such a case, formation of the microstructure, in addition to the nanostructure, on the same surface of the mold allows a production-efficient mold to be obtained.

Preferably, the mold includes a conductive rod passing through the inside of the mold, the conductive rod includes a side face covered with an insulating film, the conductive rod includes at least one end portion exposed to the outside, and the conductive rod is electrically connected to a member constituting the first surface in the mold. Such a structure can make a conductive path from the outside to the member constituting the first surface through the inside of the mold (conductive rod), and therefore, the design of the surface that is an important part of the mold is not complicated.

The mold preferably includes an electrode electrically connected to a member constituting the first surface, on an outer peripheral surface. Such a structure can make a conductive path from the outside to the member constituting the first surface through the surface of the mold, and therefore, the design of the inside of the mold is not complicated.

Next, detailed descriptions are given on features and a preferable embodiment of the method for producing a mold of the present invention.

The method for producing a mold of the present invention is a method for producing a mold including a first surface having a nanostructure including plural recesses spaced at an interval of less than 1 μm between bottom points of adjacent recesses and a second surface substantially not having the nanostructure, and is suitably used for production of the mold of the present invention described above.

The method includes masking a space where the second surface is to be formed. A method for producing the nanostructure on the surface of the mold may be, for example, a chemical treatment in which an object to be treated is immersed in a reagent. For producing the first surface having a nanostructure and the second surface substantially not having the nanostructure in the same process for simplification of the production process, the region where substantially no nanostructure is to be formed is preferably masked. Suitable methods for masking include application of a tape that is resistant against the reagent, and application of a preparation for masking. In particular, application of a Kapton tape is preferable. The Kapton (registered trademark) tape is an adhesive tape prepared by applying a silicone adhesive to a polyimide film, and is efficient in terms of the effect, cost, and workability.

The method for producing a mold of the present invention is not especially limited as long as these steps are essentially included. The method may include other steps. The mold is not necessarily made of a metallic material as long as it can imprint a pattern of irregularities to a resin composition. The mold may have a plate shape or cylindrical shape. The cylindrical shape is preferable from the standpoint of productivity of nanoimprint films because the roll-to-roll method can be employed in which a mold is rotated to continuously imprint a pattern of irregularities to a film drawn from a roll.

The method preferably further includes the step of repeatedly performing anodizing the surface of an untreated mold and etching the anodized surface. In such a case, a member constituting the surface of the mold material is preferably aluminum. When the surface of the mold material is made of aluminum, for example, a porous alumina phenomenon occurs due to anodization and etching. Thereby, a large number of nanometer-sized (more specifically, the interval between the bottom points of 380 nm or less) fine pores can be formed.

Preferably, the mold includes a conductive rod passing through the inside of the mold, the conductive rod includes a side face covered with an insulating film, the conductive rod includes at least one end portion exposed to the outside, and the conductive rod is electrically connected to a member constituting the first surface in the mold. Such a structure can make a conductive path from the outside to the member constituting the first surface through the inside of the mold (conductive rod), and therefore, the design of the surface that is an important part of the mold is not complicated.

The mold preferably includes an electrode electrically connected to a member constituting the first surface, on an outer peripheral surface. Such a structure can make a conductive path from the outside to the member constituting the first surface through the surface of the mold, and therefore, the design of the inside of the mold is not complicated.

Next, detailed descriptions are given on features and preferable embodiments of the method for producing a nanoimprint film of the present invention.

The method for producing a nanoimprint film of the present invention is a method for producing a nanoimprint film including plural protrusions spaced at an interval of less than 1 μm between top points of adjacent protrusions, the method including the steps of: applying a resin composition on a base film; and imprinting a pattern by pressing a mold to the applied resin composition and curing the resin composition. In the present method, a mold is pressed to an object that is an imprint resin composition, thereby a pattern on the surface of the mold is imprinted to the resin composition to provide a nanostructured body. Curing treatment directly after the imprinting completes production of a nanoimprint film. Examples of the resin composition include: active energy ray-curable resin compositions represented by photocurable resin compositions and electron beam-curable resin compositions; and thermosetting resin compositions. In terms of easy imprinting at ambient temperatures, active energy ray-curable resin compositions are preferable. When a photocurable resin composition is used as the resin composition, preferably, a photopolymerization initiator or photosensitizer is optionally added.

The mold is the mold of the present invention or a mold produced by the method for producing a mold of the present invention. Use of such a mold significantly reduces a possibility that the mold is clogged with a resin of a hard coat layer between an imprint resin composition and a base film or an uncured resin present in a boundary portion between a resin composition and a base, and that dust adheres to the surface of the mold to cause defective imprinting. As a result, a high-performance nanoimprint film can be obtained.

The method for producing a nanoimprint film of the present invention is not especially limited as long as these steps are essentially included. The method may include other steps.

The adjacent protrusions are preferably spaced at an interval of less than 380 nm between top points of the protrusions. When the interval between top points of protrusions is set to be smaller than the wave length of visible light, the visible light component mostly passes through the nanoimprint film. Such a nanoimprint film is excellent for use as an antireflection film (moth-eye film). If such a film is used as a member constituting the front surface of a display device, for example, a produced display device can offer favorable display such that background reflections (e.g., fluorescent lamps in a room) due to reflected external light are reduced.

The interval between top points of adjacent protrusions is more preferably 300 nm or less, and still more preferably 200 nm or less that is about half the length of the wavelength of visible light. If the interval between top points of protrusions is more than 400 nm, the nanoimprint film may be colored by a blue wavelength component. When the interval is set to 300 nm or less, such an influence is sufficiently suppressed. When the interval is set to 200 nm or less, such an influence is hardly exerted.

Preferably, the mold has a cylindrical shape, and the recesses each have an aspect ratio of less than 3. When the aspect ratio is 3 or more, imprinting to prepare a moth-eye film is likely to be defective. This is because friction force relates to mold releasability, and if a stress is concentrated to top portions of protrusions, a cured resin is likely to be brittle, causing clogging. As the aspect ratio is higher, the friction force is larger and release from the mold becomes harder. The rate of imprinting to produce a moth-eye film is commonly 1 m/min or more and 100 m/min or less. Under this condition, a stress is suddenly released after formation of a pattern, so that the end of the film after imprinting is likely to be chipped. Releasability from the mold also relates to a temperature condition for imprinting and the glass transition temperature of the resin material. When a pattern has an aspect ratio of 4 or more, for formation of a highly precise pattern, a stress needs to be gradually released and the film needs to be gradually cooled even after curing of the resin. When imprinting is performed at a rate within the above-mentioned range, the temperature of the mold is presumably about 50° C. In consideration of the conditions of ultraviolet irradiation, a portion where a pattern is imprinted is presumably locally subjected to great heat. In consideration of the fact that the pressure is continuously applied until the film is released from the mold, each recess preferably has an aspect ratio of less than 3.

Preferably, the mold has a cylindrical shape, and a rate of imprinting using the mold is 1 m/min or more and 100 m/min or less. More preferably, the rate of imprinting is within a range of 10 m/min or more and 50 m/min or less. As continuous imprinting is performed at a higher rate, a stress is more suddenly released after formation of a pattern. Accordingly, if the rate of imprinting is too fast, clogging is more likely to occur. In contrast, if the rate of imprinting is too slow, reduction in throughput is concerned.

Advantageous Effects of Invention

According to the mold of the present invention, a nanoimprint film can be produced without a problem of clogging of irregularities of the mold with a resin or production of dust of the resin. According to the method for producing a mold of the present invention, the mold of the present invention is efficiently produced. Moreover, according to the method for producing a nanoimprint film of the present invention, a highly reliable nanoimprint film free from defective imprinting or defective recesses can be produced.

DESCRIPTION OF EMBODIMENTS

Figure 1:
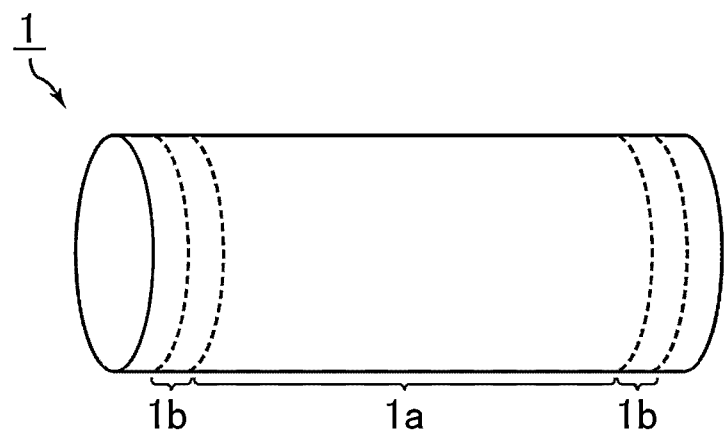
FIG. 1 is a perspective diagram schematically illustrating a mold in Embodiment 1.

The present invention will be mentioned in more detail referring to the drawings in the following embodiments, but is not limited to these embodiments.

Embodiment 1

In Embodiment 1, a production example of a moth-eye film that is a kind of a nanoimprint film is described. A moth-eye film is a nanoimprint film including plural protrusions spaced at an interval of less than 380 nm between top points of adjacent protrusions. Such a moth-eye film is produced by applying an imprint resin on a base film, pressing a mold to the applied imprint resin, and curing the imprint resin. A hard coat layer is optionally formed between the base film and the imprint resin.

Examples of the base film include triacetyl cellulose (TAC) films, diacetyl cellulose films, cellulose acetate butyrate films, polyethersulfone films, polyacrylic resin films, polyurethane resin films, polyester films, polycarbonate films, polysulfone films, polyether films, trimethylpentene films, polyether ketone films, and (meth)acrylonitrile films. In particular, TAC films and uniaxially stretched polyester films are suitably used because they have excellent transparency and no optical anisotropy.

A hard coat resin as used herein refers to a material having a hardness of H or higher determined in a pencil hardness test in conformity with JIS K5600-5-4. Examples of the hard coat resin include: active energy ray-curable resins represented by photocurable resins and electron beam-curable resins; thermoplastic resins; and thermosetting resins. The hard coat resin preferably has transparency. In forming a hard coat layer, the hard coat resin may be dissolved in a solvent so that application to a base film is facilitated.

Examples of a material of the imprint resin for producing a moth-eye film include: active energy ray-curable resins represented by photocurable resins and electron beam-curable resins; and thermosetting resins. In particular, (meth)acrylic resins are preferable. Especially preferred are urethane (meth)acrylate including an urethane bond in a molecule, ester (meth)acrylate including an ester bond in a molecule, and epoxy (meth)acrylate including an epoxy group in a molecule.

When an imprint resin is a photocurable resin, the resin preferably contains a photopolymerization initiator. When an imprint resin is a thermosetting resin, the resin preferably contains a thermal polymerization initiator. The photopolymerization initiator may have an absorption wavelength in a UV light region, a visible light region, or both regions.

A specific method for imprinting a pattern of fine irregularities on an imprint resin using a mold is a 2P method (Photo-polymerization method) in which photoirradiation is performed on the resin together with pressing of irregularities of the mold, thereby the resin is cured. Other examples thereof include various methods such as replication methods (e.g., hot pressing method (embossing method), injection molding method, sol-gel method), a method of laminating a shaping sheet with fine irregularities, or a method of imprinting a fine-irregularity layer. The method may be appropriately selected in accordance with applications of an antireflection product and the material of a base film.

The depth of a recess on the mold and height of a protrusion on the moth-eye film are measured by using a SEM (Scanning Electron Microscope).

A moth-eye film produced by the present method can be used for, for example, components (e.g., self-emitting display elements, non-self-emitting display elements, light sources, light diffuser sheets, prism sheets, polarized reflection sheets, retarders, polarizing plates, front plates, housings) for display devices, lenses, window glass, pictureflame glass, display windows, aquariums, printed materials, pictures, coated products, or lighting devices. Use of the moth-eye film can provide low-reflection properties which inhibit reflections of external light.

FIG. 1 is a perspective diagram schematically illustrating a mold in Embodiment 1. As illustrated in FIG. 1, a mold 1 used in the present embodiment is a roll plate having a cylindrical shape. The mold 1 has a nanostructure on the outer peripheral surface, so that the roll-to-roll method can be employed for continuous production of a nanoimprint film for a long time. Conventionally, when the roll-to-roll method is employed, a film may be expanded/contracted during the imprinting for a long time or waved due to external factors, and the like. Such a phenomenon causes clogging of irregularities on the mold with the resin or scattering of dust of the resin, resulting in defective imprinting. In the present embodiment, however, the surface of the mold includes a surface (first surface) 1a having a nanostructure and flat surfaces (second surfaces) 1b substantially not having the nanostructure. The second surface 1b is positioned in a region where the mold is likely to be clogged, and therefore, defective imprinting is less likely to occur even after imprinting for a long time. In FIG. 1, regions surrounded by two dotted lines near the ends of the mold are the regions where the second surface 1b is formed.

The second surface 1b on the mold is formed by masking performed during formation of a nanostructure on the mold. The masking treatment is performed by a method of applying a formulation for masking or a masking tape to a portion of the surface of an untreated mold. Examples of the formulation for masking include rubber masking formulations such as polybutadiene or polystyrene. Examples of the masking tape include polyimide, polyethylene, and polystyrene tapes. Here, the material of the masking tape needs to be appropriately changed in accordance with chemical treatment for formation of irregularities on the mold.

A method for producing a mold is specifically described in the following. Examples of the mold include two types of molds, that is, sleeve-type molds and pipe-type molds. Descriptions are given on both a sleeve-type mold and a pipe-type mold actually produced as Example 1 and Example 2, respectively. In Example 1 and Example 2, a Kapton tape is used in the masking treatment.

Example 1

Figure 2:
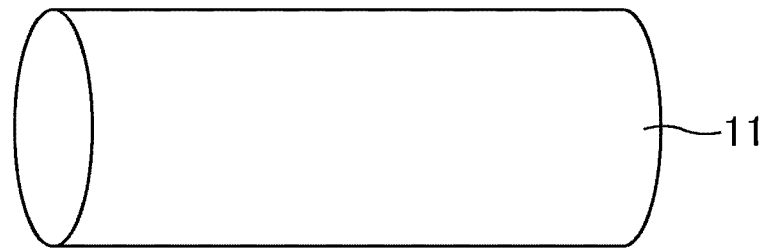
FIG. 2 is a schematic diagram illustrating a stage of production of a sleeve-type mold.

FIGS. 2 to 5 are schematic diagrams each illustrating each stage of production of a sleeve-type mold. First, as illustrated in FIG. 2, a cylindrical nickel (Ni) sleeve 11 was prepared and an insulating film was formed thereon by electrodeposition method. Such formation is also performed by spraying of an insulating material. The nickel sleeve 11 had a radius of about 300 mm and a roll width of about 1500 mm.

Electrodeposition method is specifically described. First, the nickel sleeve 11 was alkaline degreased, and washed with city water (tap water) and with pure water in sequence. Then, the nickel sleeve 11 was washed with pure water by using a shower (cleaning process). Next, the nickel sleeve was immersed in an electrodeposition liquid, and a resin film was formed on the surface of the nickel sleeve by electrodeposition (electrodeposition process). Electrodeposition was carried out at a voltage of 30 to 40 V for 300 seconds. As a result, an electrodeposited film (insulating film) having a thickness of 7 μm was formed.

When the mold of Example 1 is subjected to AG treatment, the electrodeposition may be employed. It is possible to form an insulating film including irregularities at an interval and with a height on a micron scale by changing the kind and concentration of a treatment liquid, the treatment time, and the like in the electrodeposition treatment. For example, a nickel sleeve 12 that have been masked is treated under the conditions of a voltage of 40V, a liquid temperature of 23° C., a solids content of 10%, and treatment time of 300 seconds, thereby an insulating film including irregularities spaced at an interval of 20 μm or more between bottom points of adjacent recesses is formed. Forming such an insulating film in advance allows easy formation of irregularities having the same pattern on an aluminum film formed later.

Next, an aluminum (Al) film having a thickness of 10 µm was formed on the insulating film by sputter coating.

Figure 3:
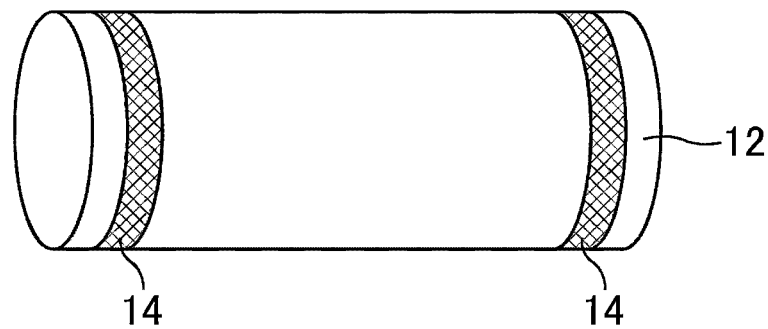
FIG. 3 is a schematic diagram illustrating a stage of production of a sleeve-type mold.

Next, as illustrated in FIG. 3, a masking treatment was performed in which a Kapton (registered trademark) film tape 14 (product of Du Pont) having a width of 4 cm was applied to the nickel sleeve (with an aluminum film) 12 at a position of 125 mm from each end. The Kapton film tape 14 is chemically resistant against oxalic acid and phosphoric acid described later and excellent in heat resistance. Thus, a region where no masking treatment was performed was formed between two masked regions.

Figure 4:
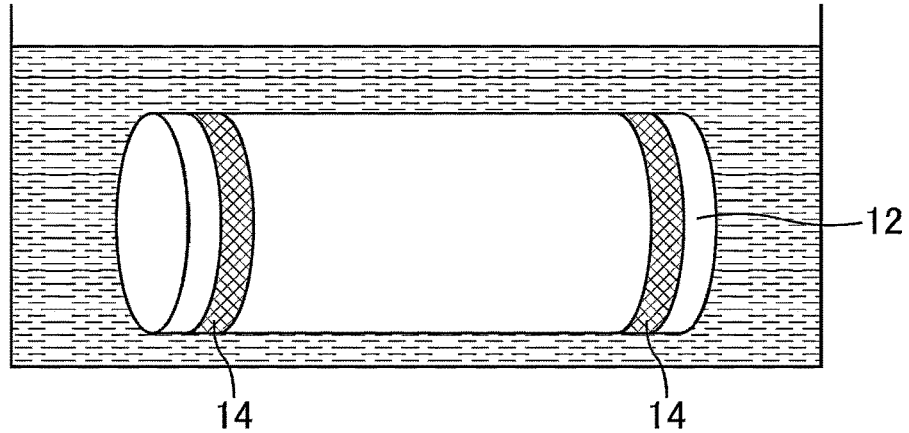
FIG. 4 is a schematic diagram illustrating a stage of production of a sleeve-type mold.

Next, as illustrated in FIG. 4, the masked nickel sleeve 12 was immersed in a 0.1 mol/l oxalic acid solution to be electrolyzed at 18° C. for 35 seconds, and then immersed in pure water for washing (anodization process). The resulting nickel sleeve 12 was immersed in a 0.3 mol/l phosphoric acid solution for etching at 18° C. for 19 minutes, and then immersed in pure water again for washing (etching process).

A cycle including the anodization process and the etching process was repeated for six times, and the anodization process was performed one last time. Through such continuous repetition of the anodization process and the etching process, abnormally grown grains were formed on the film, excepting masked regions, and a large number of fine holes were formed which were spaced at an interval of 380 nm or less between bottom points of adjacent holes (recesses) and had a tapered shape towards the inside of the aluminum film.

Figure 5:
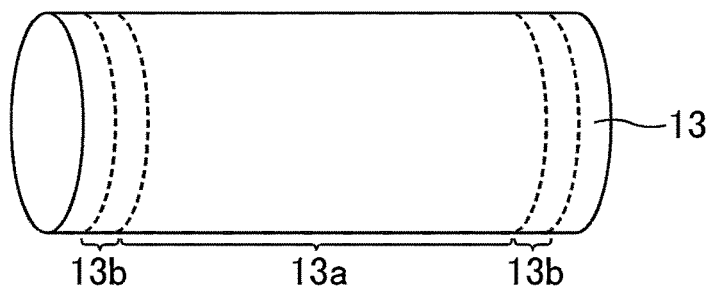
FIG. 5 is a schematic diagram illustrating a stage of production of a sleeve-type mold.

Finally, as illustrated in FIG. 5, the Kapton film tape used in the masking treatment was removed, thereby production of a cylindrical mold 13 including a surface (first surface) 13a having a nanostructure including fine irregularities and flat surfaces (second surfaces) 13b substantially not having the nanostructure was completed. Here, a material of a member constituting the first surface 13a where no masking treatment was performed was alumina ($Al_2O_3$), and materials of members constituting the second surfaces 13b where masking treatment was performed were still aluminum (Al).

Figure 6:
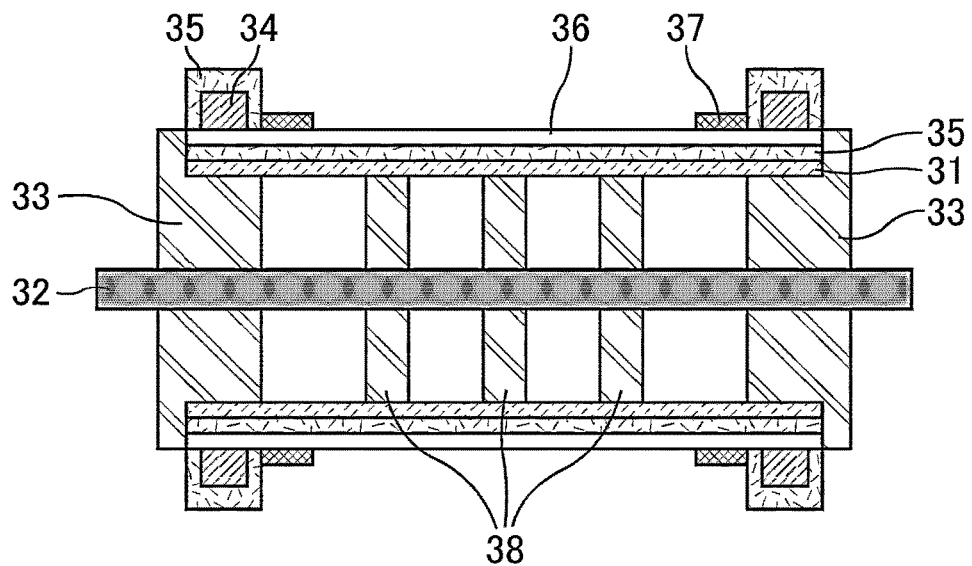
FIG. 6 is a schematic diagram of a cross section of a nickel sleeve during anodization and etching in Example 1.

The structure of the mold of Example 1 is more specifically described. FIG. 6 is a schematic diagram of a cross section of a nickel sleeve during anodization and etching in Example 1. The nickel sleeve 31 has an internal hollow, and a shaft 32 passes through the hollow at the center. The nickel sleeve 31 is sealed at each end with a resin 33, and the shaft 32 extends out of the nickel sleeve 31 via through holes provided in the resin 33 at each end of the sleeve 31. Since the shaft 32 is fixed to the nickel sleeve 31, when the shaft 32 is rotated, the nickel sleeve 31 is also rotated. In the nickel sleeve 31, three support rods 38 made from a resin are provided. The surface of the nickel sleeve 31 is covered with an insulating film 35, and the surface of the insulating film 35 is covered with an aluminum film 36. A Kapton tape 37 having a width of 4 cm is applied to the aluminum film 36 at a position of 125 mm from each end of the aluminum film 36. An electrode 34 is provided beside each Kapton tape 37 on the side closer to the end of the aluminum film 36. The electrode 34 is covered with an insulating film 35 while securing a path conducting to the outside. An electrolysis vessel is filled with an electrolyte solution and has an inner surface covered with a metal film. The electrodes 34 on the aluminum film 36 serve as anodes and an electrode on the inner surface of the vessel serves as a cathode, so that the surface of the aluminum film 36 is anodized in the electrolyte solution. In the case where the mold of Example 1 is used, a space for mounting the electrode 34 needs to be kept. Accordingly, the Kapton tape 37 cannot be applied to cover each end portion of the aluminum film 36 and needs to be applied to a portion of the film slightly apart from each end portion.

In Example 1, a cylindrical mold was horizontally set. Depending on the mechanism of a jig and treatment vessel, the cylindrical mold may be vertically set.

Figure 7:
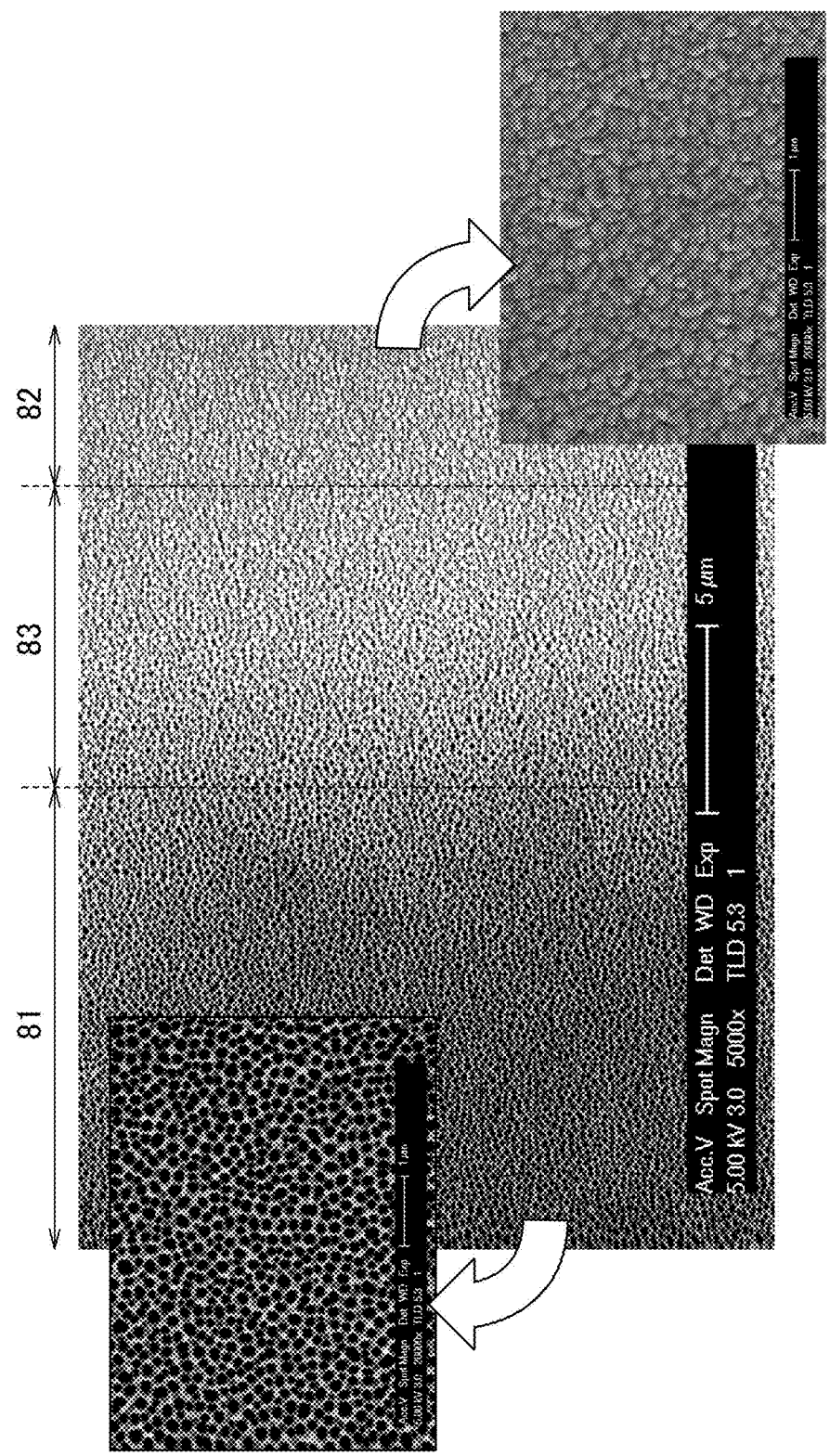
FIG. 7 is a SEM picture of the surface of the mold of Example 1, and an enlarged picture on the left shows a region where the nanostructure is formed and an enlarged picture on the right shows a region where the nanostructure is not formed.

An actual picture of the surface of the mold of Example 1 is shown below. FIG. 7 is a SEM picture of the surface of the mold of Example 1, and an enlarged picture on the left shows a region where the nanostructure is formed and an enlarged picture on the right shows a region where the nanostructure is not formed. As illustrated in FIG. 7, the surface of the mold is classified into three regions including a region 81 where fine pores are formed spaced at an nanometer interval (region having a nanostructure), a region 82 where fine pores are not formed (region not having a nanostructure), and a region 83 where defective fine pores are formed. The reason for presence of the region 83 where defective fine pores are formed is imperfect masking as application of the Kapton tape is employed as a masking method. It is to be noted that such defective fine pores does not adversely affect actual production of a moth-eye film.

Example 2

Figure 8:
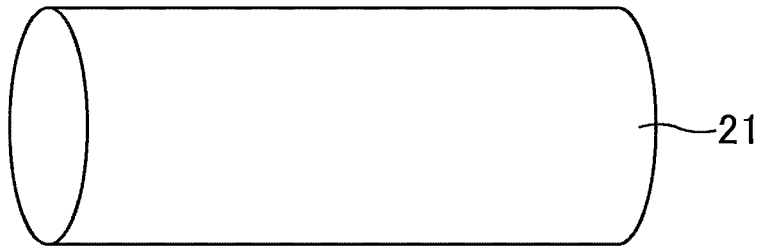
FIG. 8 is a schematic diagram illustrating a stage of production of a pipe-type mold.

FIGS. 8 to 11 are schematic diagrams each illustrating each stage of production of a pipe-type mold. As illustrated in FIG. 8, a cylindrical aluminum (Al) pipe 21 was prepared. The aluminum pipe 21 had a size of about 300 mm in radius, about 1000 mm in roll width, and about 15 mm in thickness.

Figure 9:
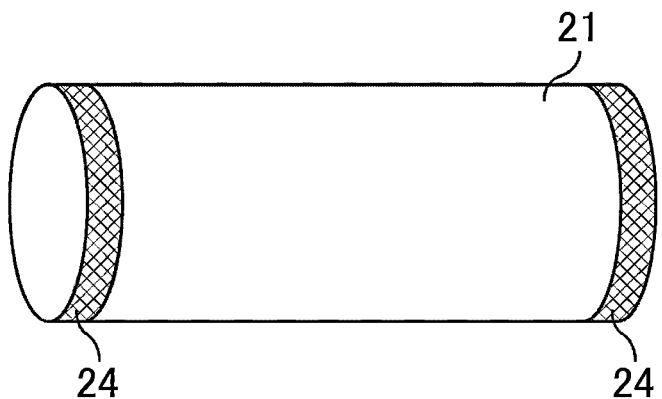
FIG. 9 is a schematic diagram illustrating a stage of production of a pipe-type mold.

Next, as illustrated in FIG. 9, a masking treatment was performed in which a Kapton (registered trademark) film tape 24 (product of Du Pont) having a width of 4 cm was applied to the aluminum pipe 21 at a position of 50 mm from each end. The distance from the end may be 70 mm. The Kapton film tape 24 is chemically resistant against oxalic acid and phosphoric acid and is excellent in heat resistance. Thus, an unmasked region was formed between two masked regions.

Figure 10:
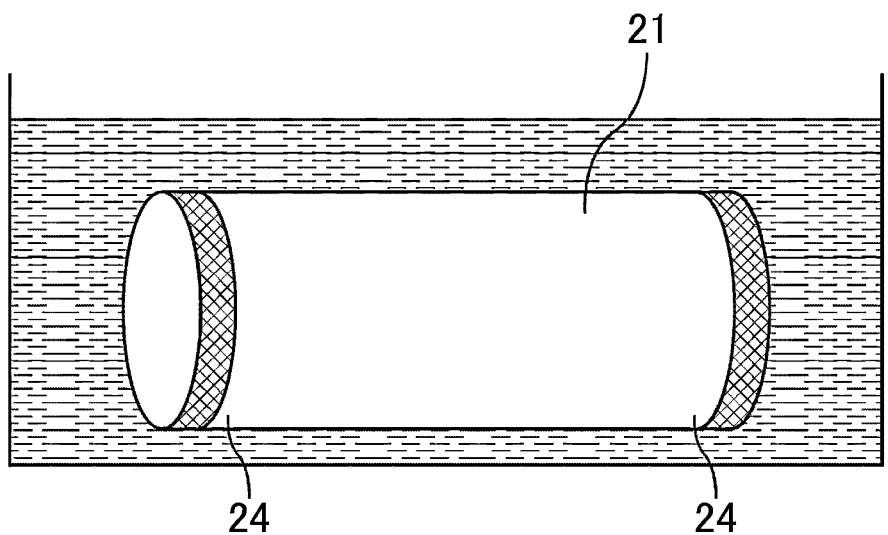
FIG. 10 is a schematic diagram illustrating a stage of production of a pipe-type mold.

Next, as illustrated in FIG. 10, the masked aluminum pipe 21 was immersed in a 0.1 mol/l oxalic acid solution for electrolysis at 18° C. for 35 seconds, and then immersed in pure water for washing (anodization process). Then, the resulting aluminum pipe 21 was immersed in a 0.3 mol/l phosphoric acid solution for etching at 18° C. for 19 minutes, and then immersed in pure water again for washing (etching process).

A cycle including the anodization process and the etching process was repeated for six times, and the anodization process was performed one last time. Through such continuous repetition of the anodization process and the etching process, abnormally grown grains were formed on the pipe, excepting masked regions, and a large number of fine holes were formed which were spaced at an interval of 380 nm or less between bottom points of adjacent holes (recesses) and had a tapered shape towards the inside of the aluminum pipe 21.

Figure 11:
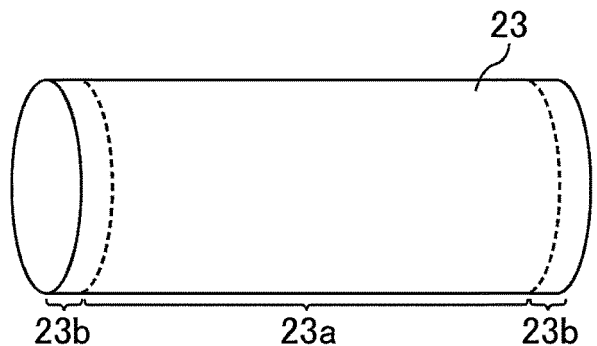
FIG. 11 is a schematic diagram illustrating a stage of production of a pipe-type mold.

Finally, as illustrated in FIG. 11, the Kapton film tape used in the masking treatment was removed, thereby a cylindrical mold was produced which had a surface (first surface) 23a having a nanostructure including fine irregularities and flat surfaces (second surfaces) 23b substantially not having the nanostructure. Here, a material of a member constituting the first surface 23a where no masking treatment was performed was alumina ($Al_2O_3$), and materials of members constituting the second surfaces 23b where masking treatment was performed were still aluminum (Al).

Figure 12:
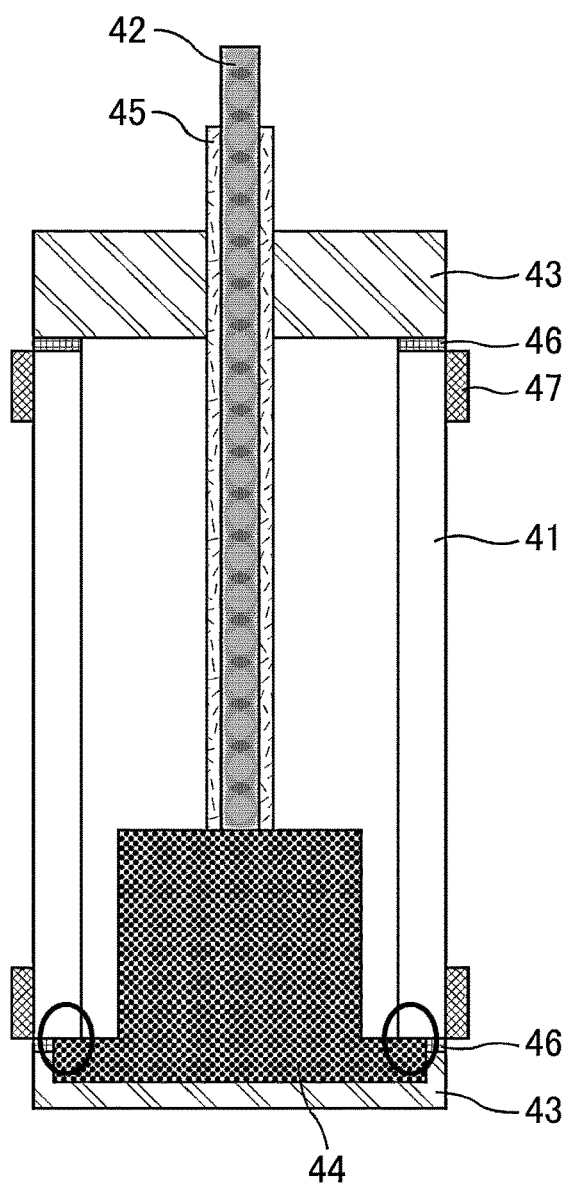
FIG. 12 is a schematic diagram of a cross section of an aluminum pipe during anodization and etching in Example 2.

The structure of the aluminum pipe of Example 2 is more specifically described. FIG. 12 is a schematic diagram of a cross section of an aluminum pipe during anodization and etching in Example 2. An aluminum pipe 41 has an internal hollow, and a shaft (conductive rod) 42 passes through the hollow at the center. The aluminum pipe 41 is sealed at each end with a resin 43 via a packing 46, and the shaft 42 extends out of the aluminum pipe 41 via a through hole provided in the resin 43 on one end of the aluminum pipe 41. Since the shaft 42 is fixed to the aluminum pipe 41, when the shaft 42 is rotated, the aluminum pipe 41 is also rotated. The shaft 42 has a surface covered with an insulating film 45. The end where the shaft 42 does not penetrate is in contact with a metal member 44 that serves as a weight. The metal member 44 is partly in contact with the outer peripheral surface of the aluminum pipe 41 (Circled portions in FIG. 12). With this configuration, the shaft 42 can be used as a path running inside the aluminum pipe 41 for sending current from the outside. A Kapton tape 47 having a width of 4 cm is applied along each end of the aluminum pipe 41. An electrolysis vessel is filled with an electrolyte solution and has an inner surface covered with a metal film. In Example 2, the shaft 42 and the metal member 44 serve as anodes and an electrode on the inner surface of the vessel serves as a cathode, so that the surface of the aluminum pipe 41 is anodized in the electrolyte solution. In Example 2, the Kapton tape 47 may be applied in such a manner of covering each end portion of the aluminum pipe 41, but it may also be applied at a portion of the aluminum pipe 41 apart from each end portion according to needs.

In Example 2, a cylindrical mold was horizontally set. Depending on the mechanism of a jig and treatment vessel, the cylindrical mold may be vertically set.

Next, the method for producing a moth-eye film is specifically described. Types of the moth-eye film include two types that are a film having a hard coat layer and a film not having a hard coat layer. Descriptions are given on both films actually produced as Example 3 and Example 4, respectively.

Example 3

In Example 3, a description is given on a case where a hard coat layer is provided between a base film and an imprint resin layer. A hard coat layer provided as an intermediate layer between a base film and an imprint resin layer enables to achieve both the surface durability and adhesiveness between the base film and the imprint resin layer.

A hard coat resin was dissolved in a solvent to give a solution and the solution was applied on a base film by gravure coating method. Then, the applied solution was dried at 80° C. for 30 seconds for volatilization of the solvent. Since the hard coat resin is softer than an imprint resin, unless the hard coat resin is completely cured by photoirradiation, the following problems may occur. That is, the resin may clog irregularities of the mold, so that the film cannot be removed from the roll plate. Then, the film may be wrapped around the roll plate, so that continuous imprinting cannot be performed. In addition, the clogging hard coat resin is rubbed during the continuous imprinting to produce dust, which may be stirred up in air during the process to adhere to the mold. When dust is adhered to the surface of the mold as a foreign matter, its trace is imprinted to the moth-eye film, causing a defect (a defect by white particles). In Example 3, a moth-eye film was produced by using the mold of Example 1.

Figure 13:
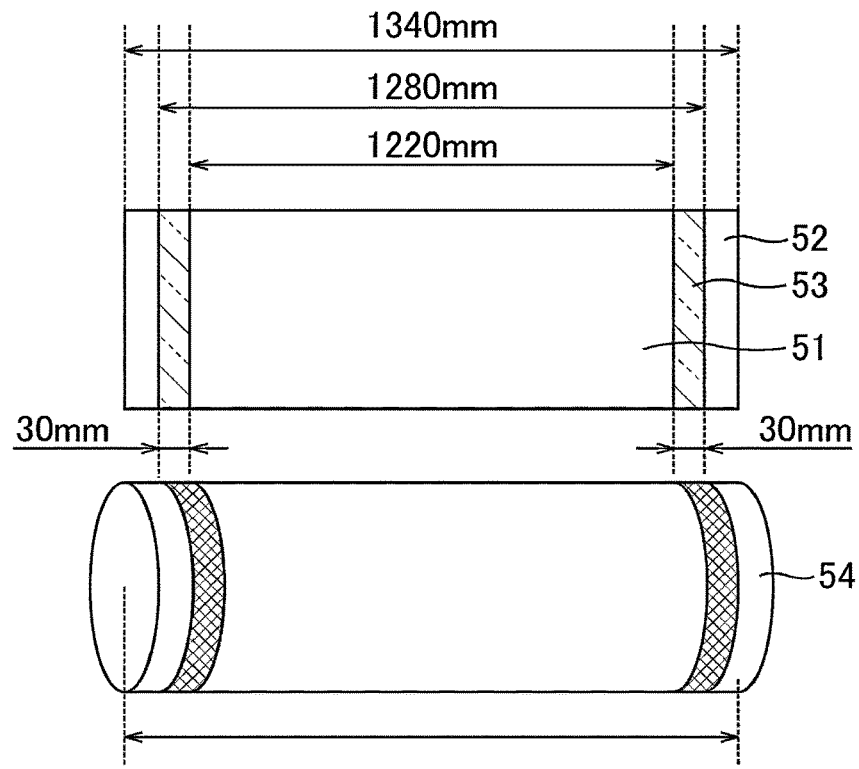
FIG. 13 is a schematic diagram illustrating a state of rolling a mold with a surface including protrusions on a nano scale, on the surface of a film including a laminate of a base film, hard coat layer, and imprint resin layer, thereby providing a moth-eye structure to an imprint resin of a moth-eye film.

FIG. 13 is a schematic diagram illustrating a state of rolling a mold with a surface including protrusions on a nano scale, on the surface of a film including a laminate of a base film, hard coat layer, and imprint resin layer, thereby providing a moth-eye structure to an imprint resin of a moth-eye film. Though the mold of Example 1 was used here, also usable was the mold of Example 2. As illustrated in FIG. 13, a mold 54 had a cylindrical shape and a rotatable mechanism. The rate of imprinting was set to about 10 m/min. The mold 54 had a surface including irregularities on a nano scale. The mold 54 was pressed on an imprint resin layer 51, thereby the irregularities on a nano scale were imprinted to the surface of the imprint resin layer 51. At the same time, a treatment for curing the resin such as photoirradiation was performed to form a moth-eye structure. Thus prepared protrusions each had an aspect ratio of 1 (interval between top points: 200 nm, height of a protrusion: 200 nm).

The size of each film was set as follows. When a current-standard TAC film (base film) 52 had a width of 1340 mm, since an application margin of 30 mm was needed on each side for forming an inner layer, the hard coat layer 53 was set to have a width of 1280 mm. In addition, since an application margin of 30 mm was needed on each side for forming a further inner layer, the imprint resin layer 51 was set to have a width of 1220 mm.

As described in Example 1 and Example 2, these molds were masked before anodization by application of a Kapton tape to a part that would contact the hard coat layer 53. Accordingly, a region that would contact the hard coat layer 53 did not have a nanostructure substantially, enabling continuous imprinting for a long time without a problem of clogging. The present inventors actually performed imprinting operation to succeed about 3500 m of continuous imprinting. In addition, defects by white particles were also suppressed.

Example 4

In Example 4, a description is given on a case where a hard coat layer is not provided between a base film and an imprint resin layer.

An imprint resin (without solvent) was applied on a base film by die coating method. At the border between the base film and the imprint resin layer, since the imprint resin layer was exposed to the outside, curing was inhibited by oxygen inhibition even with photoirradiation, and the resin was not completely cured. If the uncured resin is subjected to imprinting by a roll plate, the resin may clog irregularities on the mold, so that the film cannot be removed from the roll plate. Then, the film may be wrapped around the roll plate, so that continuous imprinting cannot be performed. Even if such a problem does not arise, a pale streak may be occurred in the boundary portion between the base film and the imprint resin layer. In Example 4, a moth-eye film was produced by using the mold of Example 1.

Figure 14:
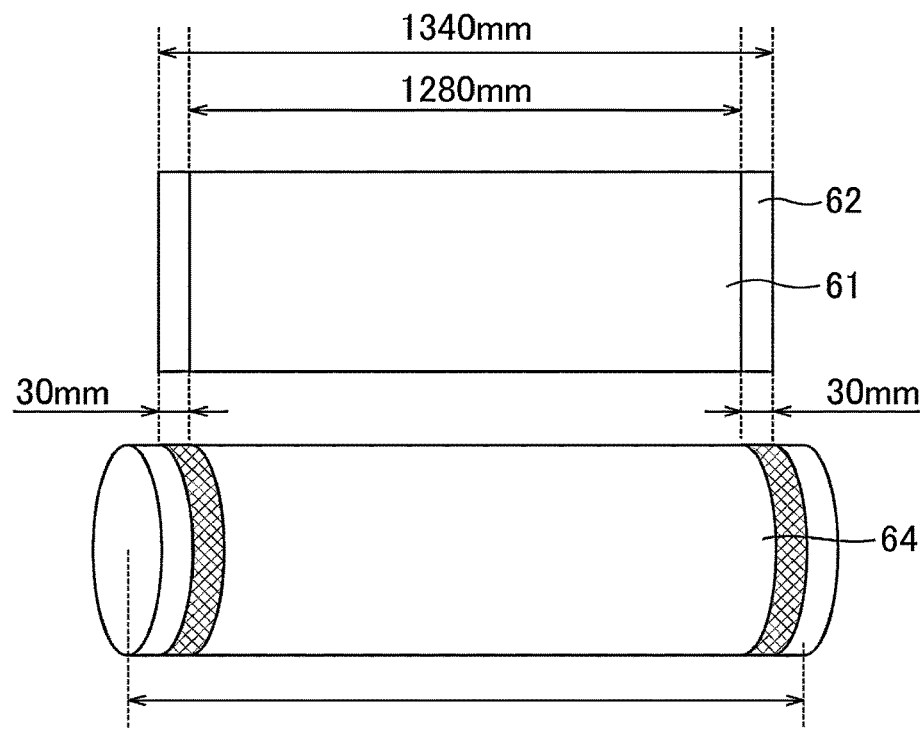
FIG. 14 is a schematic diagram illustrating a state of rolling a mold with a surface including protrusions on a nano scale, on the surface of a film including a laminate of a base film and imprint resin layer, thereby providing a moth-eye structure to an imprint resin of a moth-eye film.

FIG. 14 is a schematic diagram illustrating a state of rolling a mold with a surface including protrusions on a nano scale, on the surface of a film including a laminate of a base film and imprint resin layer, thereby providing a moth-eye structure to an imprint resin of a moth-eye film. Though the mold of Example 1 was used here, also usable was the mold of Example 2. As illustrated in FIG. 14, a mold 64 had a cylindrical shape and a rotatable mechanism. The rate of imprinting was set to about 10 m/min. The mold 64 had a surface including irregularities on a nano scale. The mold 64 was pressed on an imprint resin layer 61, thereby the irregularities on a nano scale were imprinted to the surface of the imprint resin layer 61. At the same time, a treatment for curing the resin such as photoirradiation was performed to form a moth-eye structure. Thus prepared protrusions each had an aspect ratio of 1 (interval between top points: 200 nm, height of a protrusion: 200 nm).

The size of each film was set as follows. When a current-standard TAC film (base film) 62 had a width of 1340 mm, since an application margin of 30 mm was needed on each side for forming an inner layer, the imprint resin layer 61 was set to have a width of 1280 mm. According to the method of Example 4, since a hard coat layer is not provided, a produced moth-eye film may have a larger area in one process than the case using the method of Example 3. In addition, generation of dust due to the hard coat layer is also avoided. However, another treatment is required to secure surface durability of the film and adhesiveness between the base film and the imprint resin layer.

The molds described in Example 1 and Example 2 were masked before anodization by application of a Kapton tape to a part that would contact the hard coat layer. Accordingly, a region in contact with the hard coat layer does not have a nanostructure substantially, enabling continuous imprinting for a long time without a problem of clogging. The present inventors actually performed imprinting operation to succeed about 3500 m of continuous imprinting. In addition, defects by white particles were also suppressed.

Figure 15:
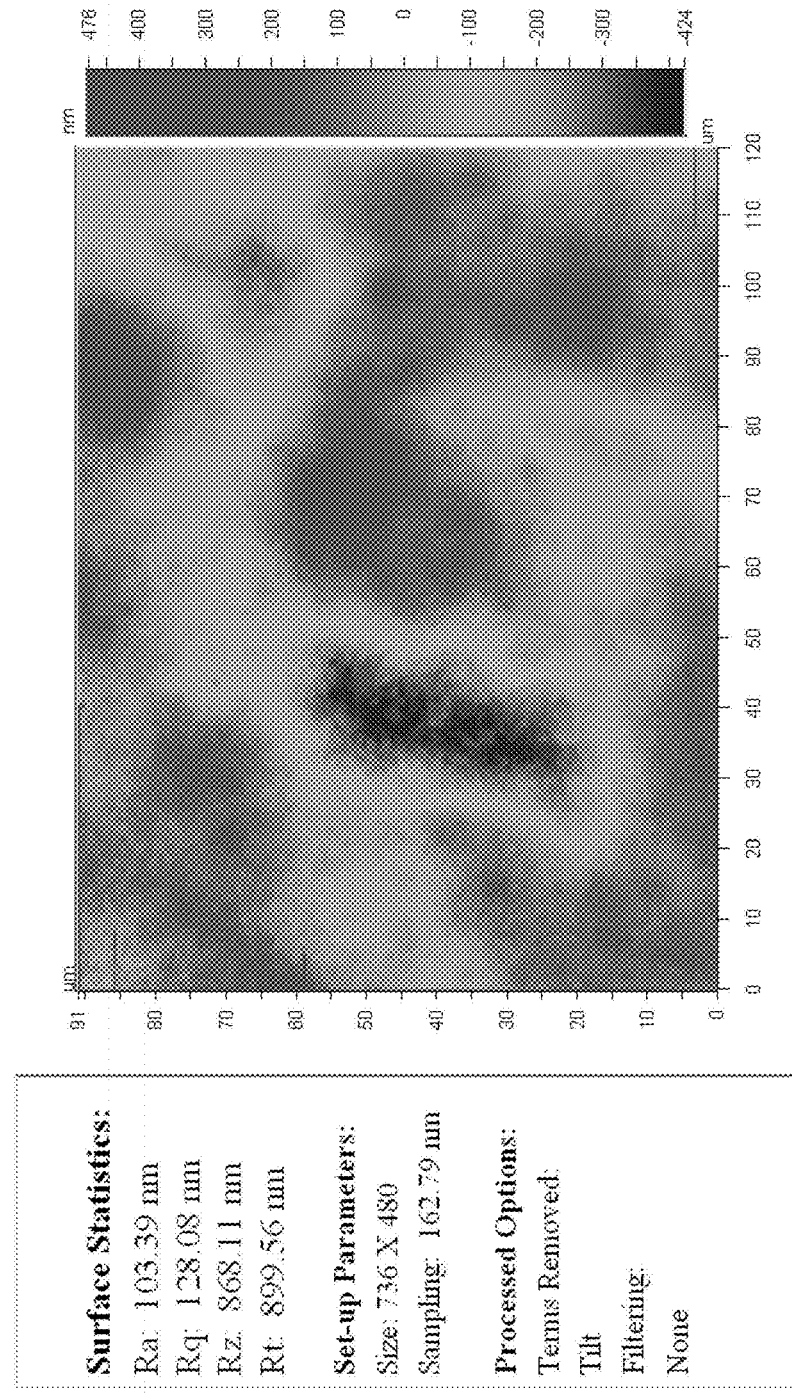
FIG. 15 is a profile picture of a moth-eye film after AG treatment.

Here, a description is given on the moth-eye films of Example 3 and Example 4 further subjected to AG treatment. FIG. 15 is a profile picture of a moth-eye film after AG treatment. In FIG. 15, a dark part indicates a region that is higher or lower relative to the standard height.

Table 1 shows data obtained in measurement of pitches (XY) and heights (Z) of AG irregularities at arbitrary 15 points on the moth-eye film shown in FIG. 15.

TABLE 1

| No. | XY | Z |
|---|---|---|
| 1 | 40-50 μm | 0.70 μm |
| 2 | 30-40 μm | 0.70 μm |
| 3 | 40-50 μm | 0.75 μm |
| 4 | 30-40 μm | 0.80 μm |
| 5 | 40-50 μm | 0.80 μm |
| 6 | 40-50 μm | 0.80 μm |
| 7 | 40-50 μm | 0.85 μm |
| 8 | 40-50 μm | 0.85 μm |
| 9 | 40-50 μm | 0.80 μm |
| 10 | 30-40 μm | 0.85 μm |
| 11 | 30-40 μm | 0.90 μm |
| 12 | 40-50 μm | 0.90 μm |
| 13 | 40-50 μm | 0.90 μm |
| 14 | 40-60 μm | 0.90 μm |
| 15 | 20-30 μm | 0.70 μm |

Since no clogging with a resin occurs and favorable effect of blurring an image is achieved in a numerical range of Table 1, the mold preferably have a surface further having a microstructure including plural recesses spaced at an interval of 20 μm or more and 60 μm or less between bottom points of adjacent recesses.

Comparative Experiment

Here, a description is given on cases where imprinting is performed to a hard coat resin and to an imprint resin by using a mold for forming a moth-eye structure.

Figure 16:
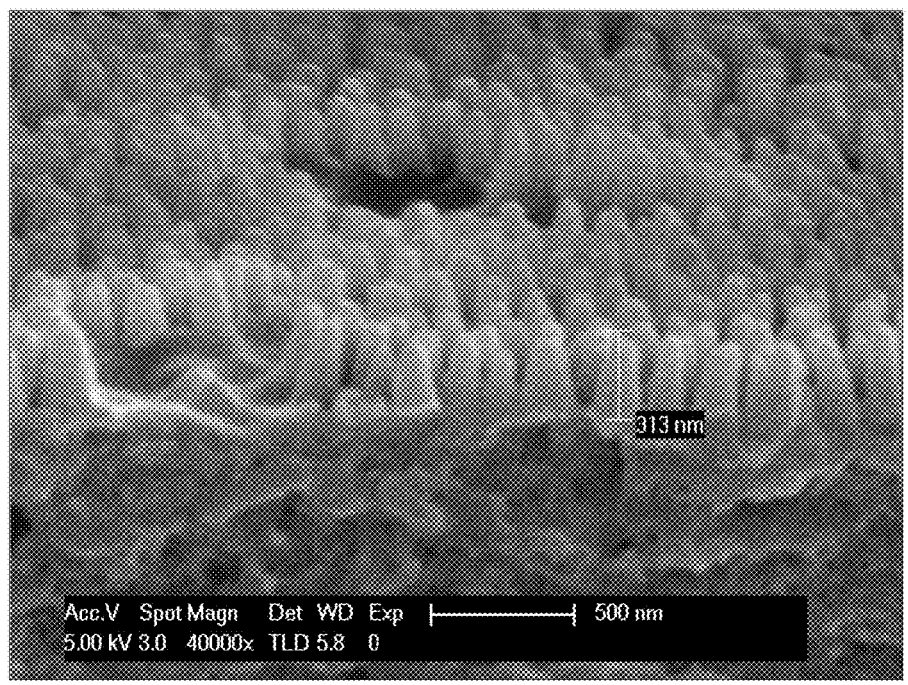
FIG. 16 is a SEM picture showing a hard coat resin to which a pattern of irregularities on the mold is imprinted.
Figure 17:
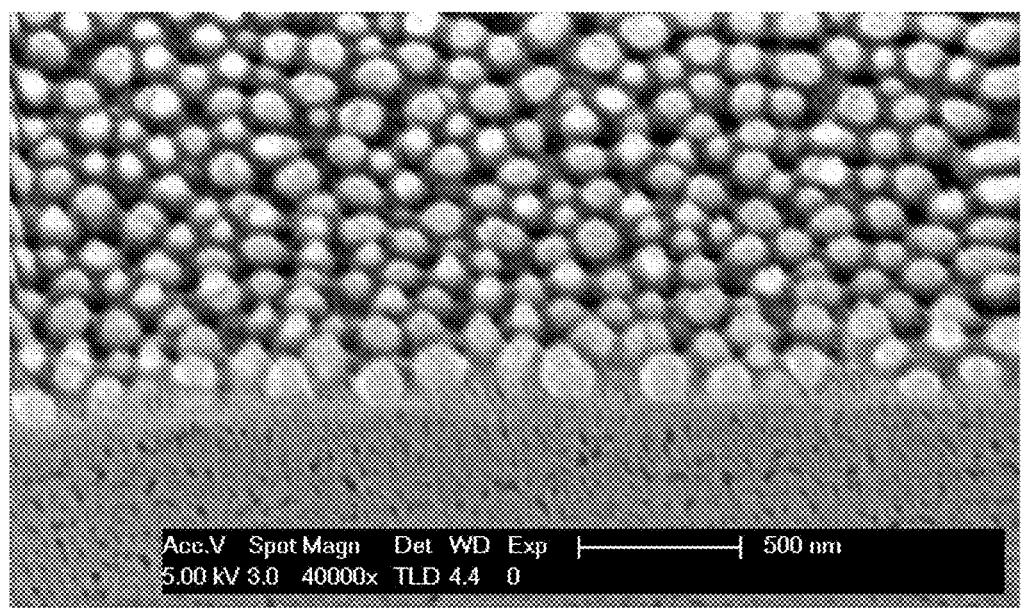
FIG. 17 is a SEM picture showing an imprint resin of a moth-eye film to which a pattern of irregularities on the mold is imprinted.

FIG. 16 is a SEM picture showing a hard coat resin to which a pattern of irregularities on the mold is imprinted. FIG. 17 is a SEM picture showing an imprint resin of a moth-eye film to which a pattern of irregularities on the mold is imprinted. These pictures were taken when each resin is manually removed from the mold right after pressing of the mold to the resin.

Both FIG. 16 and FIG. 17 show imprinted irregularities of the mold, and the protrusions are different in height. In the hard coat resin shown in FIG. 16, the protrusions had a height of 313 nm, and in the imprint resin of the moth-eye film shown in FIG. 17, the protrusions had a height of 160 nm. This shows that the hard coat resin had a filling rate (ratio of the height of a protrusion on the moth-eye film to the depth of a recess on the mold) twice the filling rate of the imprint resin of the moth-eye film. Such a difference in height is presumably caused by difference in hardness of the resin.

Figure 18:
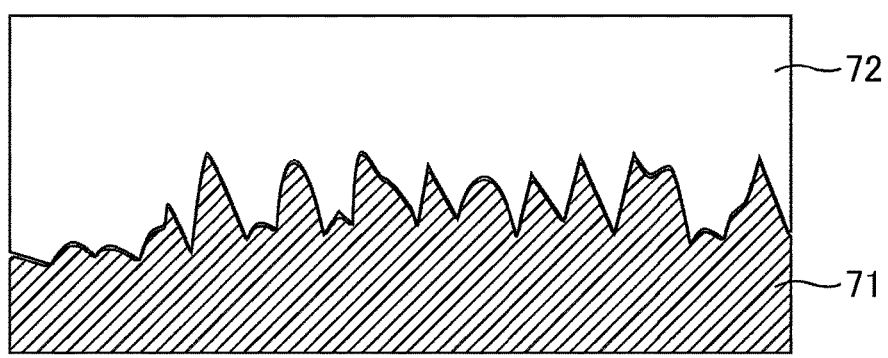
FIG. 18 is a SEM picture taken after pressing the mold to an imprint resin of a moth-eye film and before release from the mold.
Figure 19:
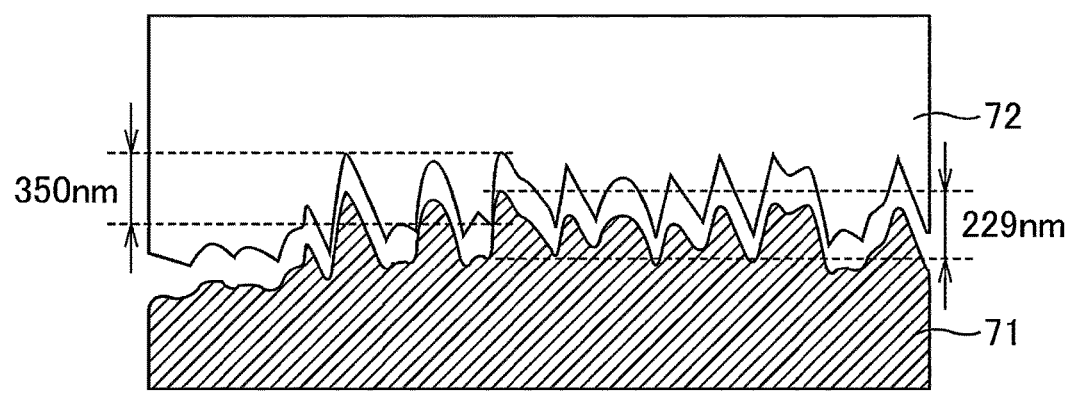
FIG. 19 is a SEM picture taken after pressing the mold to an imprint resin of a moth-eye film and after release from the mold.
Figure 20:
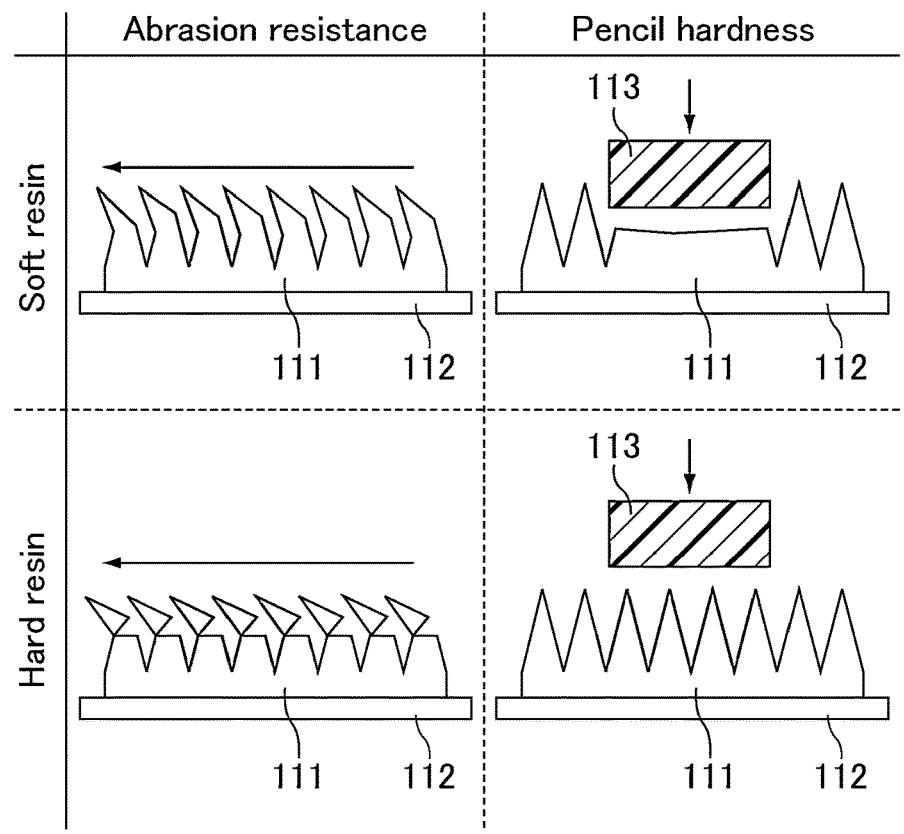
FIG. 20 is a schematic diagram illustrating nanoimprint films classified by relations between the resin hardness thereof and the pencil hardness and abrasion resistance.
Figure 21:
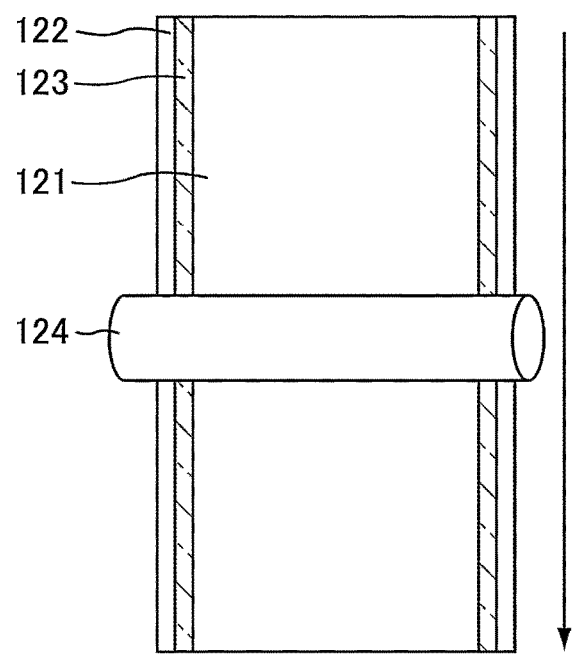
FIG. 21 is a schematic diagram illustrating a state where a mold with nanometer-sized irregularities on its surface is rolled on the surface of a film including a laminate of a base film, a hard coat layer, and an imprint resin layer, to provide the imprint resin with a nanostructure.
Figure 22:
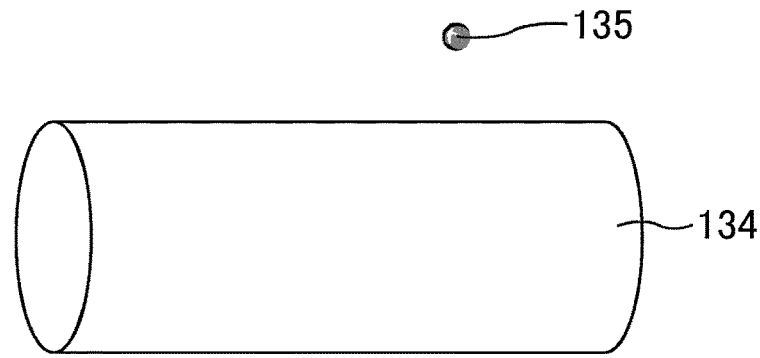
FIG. 22 is a schematic diagram illustrating a process in which a defective recess is formed when a roll-shaped mold is used.
Figure 23:
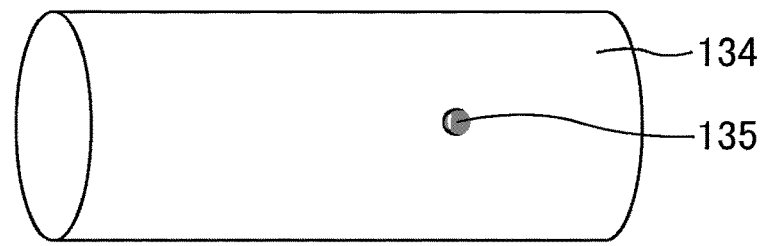
FIG. 23 is a schematic diagram illustrating a process in which a defective recess is formed when a roll-shaped mold is used.
Figure 24:
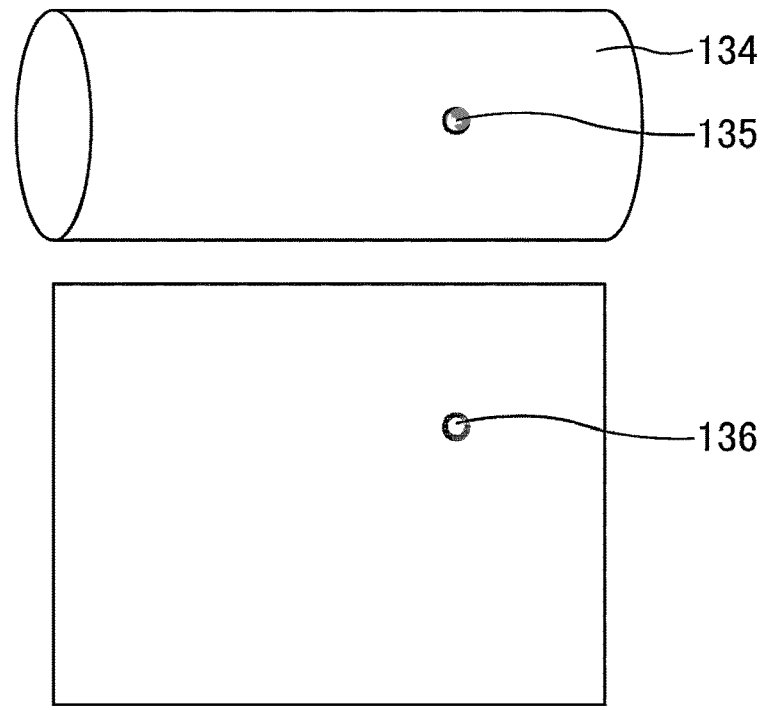
FIG. 24 is a schematic diagram illustrating a process in which a defective recess is formed when a roll-shaped mold is used.
Figure 25:
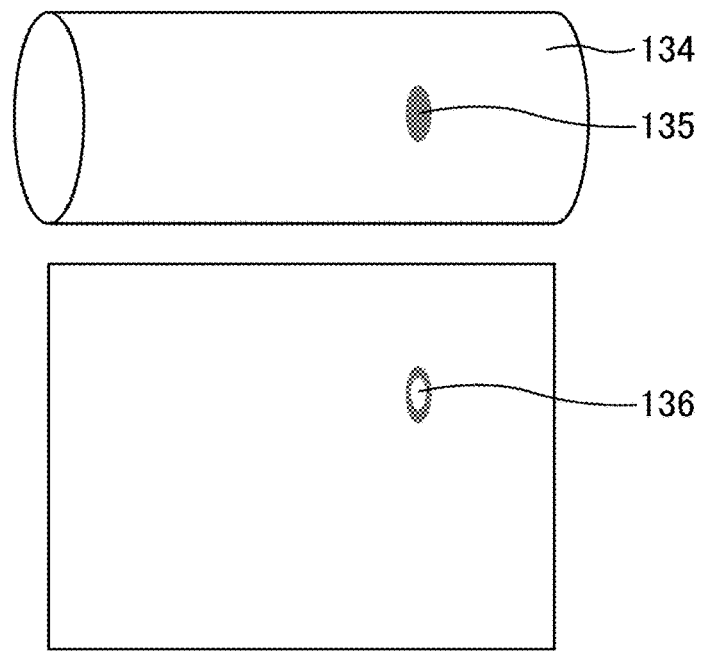
FIG. 25 is a schematic diagram illustrating a process in which a defective recess is formed when a roll-shaped mold is used.
Figure 26:
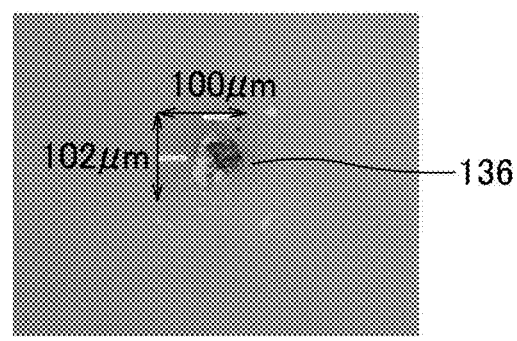
FIG. 26 is a picture showing a portion where a defective recess is formed and shows the defective recess after the first rolling.
Figure 27:
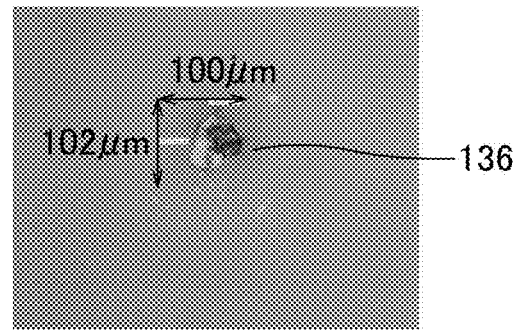
FIG. 27 is a picture showing a portion where a defective recess is formed and shows the defective recess after the second rolling.
Figure 28:
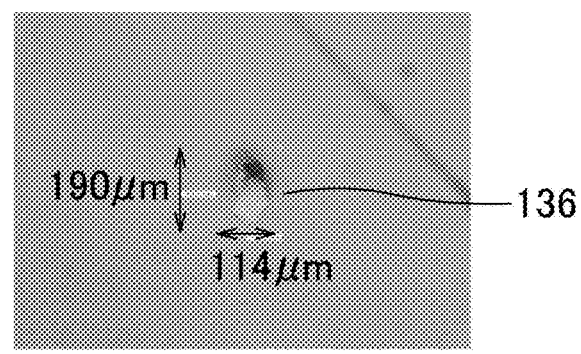
FIG. 28 is a picture showing a portion where a defective recess is formed and shows the defective recess after the 45$^{th}$ rolling.

FIGS. 18 and 19 are SEM pictures taken after pressing the mold to an imprint resin of a moth-eye film and before/after release from the mold. As illustrated in FIG. 18, when a mold 72 was pressed, grooves (depth: 350 nm) of irregularities on the mold 72 were completely filled with an imprint resin layer 71. However, as illustrated in FIG. 19, the protrusions on the imprint resin layer 71 after release had a smaller height of about 229 nm. Based on this result, it is presumable that, though grooves of irregularities on the mold 72 are once completely filled with the imprint resin layer 71, the height of the protrusions is lowered due to stress difference, and the like.

Based on the result, it is presumable that, since the hard coat resin had a filling rate twice the rate of the imprint resin of the moth-eye film, the hard coat resin deeply enters the grooves of the plate to clog and therefore is not released from the mold. Then, the film may be wrapped around the plate. Several actions to prevent this phenomenon can be considered. The effective action is providing a mold with a portion where no nanostructure is formed by masking the mold during its production in consideration of the following points: (1) since the depth of the groove on the roll plate is determined in consideration that the imprint resin of the moth-eye film has a filling rate corresponding to about 60% of the depth of the groove on the roll plate, shallowing the depth of the groove on the roll plate (recess) is not practical; (2) the application width of the hard coat resin and that of the imprint resin of the moth-eye film cannot be completely the same for the process reasons; and (3) if the application width of the imprint resin of the moth-eye film is wider than that of the hard coat resin, the protruding imprint resin of the moth-eye film is likely to adhere to the roll plate.

The present application claims priority to Patent Application No. 2011-054537 filed in Japan on Mar. 11, 2011 under the Paris Convention and provisions of national law in a designated State, the entire contents of which are hereby incorporated by reference.

REFERENCE SIGNS LIST

1, 13, 54, 64, 72, 124, 134: Mold
1a, 13a, 23a: First surface
1b, 13b, 23b: Second surface
11, 31: Nickel sleeve
12: Nickel sleeve (with an aluminum film)
14, 24, 37, 47: Kapton (film) tape
21: Aluminum pipe
32: Shaft
33, 43: Resin (for sealing)

34: Electrode
35: Insulating film
36: Aluminum film
38: Support rod
41: Aluminum pipe
42: Shaft (conductive rod)
44: Metal member (weight)
45: Insulating film
46: Packing
51, 61, 71, 121: Imprint resin layer
52, 62, 112, 122: Base film
53, 123: Hard coat layer
81: Region having a nanostructure
82: Region not having a nanostructure
83: Region where defective fine pores are formed
111: Nanoimprint film
113: Pencil
135: Dust
136: Defective recess

The invention claimed is:

1. A method for producing a nanoimprint film including plural protrusions spaced at an interval of less than 1 μm between top points of adjacent protrusions, the method comprising the steps of:
    forming a hard coat layer on a base film;
    applying an imprint resin composition on the hard coat layer; and
    imprinting a pattern by pressing a mold to the applied imprint resin composition and curing the imprint resin composition,
    wherein the mold comprises a first surface having a nanostructure including plural recesses spaced at an interval of less than 1 μm between bottom points of adjacent recesses; and at least two second surfaces substantially not having the nanostructure,
    wherein the first surface is coplanar with the at least two second surfaces and is positioned between two second surfaces,
    wherein the at least two second surfaces are formed by masking portions of the mold apart from each end portion without masking end portions of the mold,
    wherein the hard coat layer has a narrower width than the base film,
    wherein the imprint resin composition is applied on a main region of the hard coat layer and is not applied on an edge region of the hard coat layer in the step of applying, the edge region of the hard coat layer being exposed, and
    wherein the first surface of the mold is pressed on the main region and the at least two second surfaces of the mold are pressed on the edge region in the step of imprinting.

2. The method for producing a nanoimprint film according to claim 1,
    wherein the hard coat layer is softer than the imprint resin composition when the mold is pressed to the imprint resin composition in the step of imprinting, and the cured hard coat layer is harder than the cured imprint resin composition.

3. The method for producing a nanoimprint film according to claim 1,
    wherein the adjacent protrusions are spaced at an interval of less than 380 nm between top points of the protrusions.

4. The method for producing a nanoimprint film according to claim 1,
    wherein the mold has a cylindrical shape, and
    the recesses each have an aspect ratio of less than 3.

5. The method for producing a nanoimprint film according to claim 1,
    wherein the mold includes a base member covered with a member constituting the first surface and members constituting the at least two second surfaces.

6. The method for producing a nanoimprint film according to claim 5,
    wherein an insulating film is provided between the base member and the member constituting the first surface and between the base member and the members constituting the at least two second surfaces.

7. The method for producing a nanoimprint film according to claim 5,
    wherein a material of the member constituting the first surface is aluminum oxide, and
    materials of the members constituting the at least two second surfaces are aluminum.

8. The method for producing a nanoimprint film according to claim 5,
    wherein a material of the base member is nickel or stainless steel.

9. The method for producing a nanoimprint film according to claim 1,
    wherein the first surface has a microstructure including plural recesses spaced at an interval of 20 μm or more between bottom points of adjacent recesses.

10. The method for producing a nanoimprint film according to claim 1,
    wherein the mold includes a conductive rod passing through the inside of the mold,
    the conductive rod includes a side face covered with an insulating film,
    the conductive rod includes at least one end portion exposed to the outside, and
    the conductive rod is electrically connected to a member constituting the first surface in the mold.

11. The method for producing a nanoimprint film according to claim 1,
    wherein the mold includes an electrode electrically connected to a member constituting the first surface, on an outer peripheral surface.

12. The method for producing a nanoimprint film according to claim 1,
    wherein the masking refers to application of a tape.

13. The method for producing a nanoimprint film according to claim 1,
    wherein the mold is produced by the step of repeatedly performing anodizing the surface of an untreated mold and etching the anodized surface.

14. The method for producing a nanoimprint film according to claim 1,
    wherein a rate of imprinting using the mold is 1 m/min or more and 100 m/min or less.

15. The method for producing a nanoimprint film according to claim 1,
    wherein the hard coat layer is formed by applying a hard coat resin on a base film and curing the hard coat resin in the step of forming.

16. The method for producing a nanoimprint film according to claim 15,
    wherein the hard coat resin is dissolved in a solvent to give a solution and the solution is applied on the base film in the step of forming.

* * * * *